United States Patent
LaMontagne

(10) Patent No.: US 12,154,081 B2
(45) Date of Patent: Nov. 26, 2024

(54) SYSTEMS AND METHODS FOR FACILITATING A TIME VARYING CRYPTOCURRENCY TRANSFER OVER A DECENTRALIZED NETWORK THROUGH SMART CONTRACTS ASSOCIATED WITH CRYPTOCURRENCY BLOCKCHAIN TECHNOLOGY

(71) Applicant: Trivver, Inc., Huntington Beach, CA (US)

(72) Inventor: Joel LaMontagne, Huntington Beach, CA (US)

(73) Assignee: Trivver, Inc., Merritt Island, FL (US)

( * ) Notice: Subject to any disclaimer, the term of this patent is extended or adjusted under 35 U.S.C. 154(b) by 0 days.

(21) Appl. No.: 15/900,619

(22) Filed: Feb. 20, 2018

(65) Prior Publication Data

US 2019/0259007 A1 Aug. 22, 2019

(51) Int. Cl.
  *G06Q 20/06* (2012.01)
  *G06Q 20/38* (2012.01)

(52) U.S. Cl.
  CPC ..... *G06Q 20/0658* (2013.01); *G06Q 20/3829* (2013.01); *G06Q 2220/00* (2013.01)

(58) Field of Classification Search
  CPC ........... G06Q 20/0658; G06Q 20/3829; G06Q 2220/00; G06Q 20/405; G06Q 30/0207; G06Q 20/065
  See application file for complete search history.

(56) References Cited

U.S. PATENT DOCUMENTS

| | | | | |
|---|---|---|---|---|
| 6,895,391 B1* | 5/2005 | Kausik | .................... | G06F 21/34 705/50 |
| 7,051,923 B2* | 5/2006 | Nguyen | ............... | G06Q 20/341 235/375 |
| 7,121,456 B2* | 10/2006 | Spaeth | ................. | G06Q 20/202 235/375 |
| 7,233,926 B2* | 6/2007 | Durand | .................. | G06Q 20/10 235/375 |
| 7,353,541 B1* | 4/2008 | Ishibashi | ................. | G06F 21/10 348/E7.056 |
| 7,424,441 B2* | 9/2008 | George | .................. | G06Q 20/10 235/381 |
| 7,464,863 B2* | 12/2008 | Alberth, Jr. | .......... | G06Q 20/105 235/380 |
| 7,591,419 B2* | 9/2009 | Eckert | .................... | G06Q 20/20 235/380 |

(Continued)

*Primary Examiner* — John W Hayes
*Assistant Examiner* — Yingying Zhou
(74) *Attorney, Agent, or Firm* — Chharbra Law Firm, PC

(57) ABSTRACT

Systems and methods for facilitating a time varying cryptocurrency transfer over a decentralized network through smart contracts associated with cryptocurrency blockchain technology are disclosed. Exemplary implementations can: receive, at a network interface, a first electronic request for cryptocurrency transfer from a first account associated with a first cryptocurrency public key to a second account associated with a second cryptocurrency public key; transmit a second electronic request for a time varying cryptocurrency transfer from the second account to a third account associated with a third cryptocurrency public key; and upon completion of the second smart contract, fulfill the first set of conditions, thereby completing the first smart contract.

20 Claims, 4 Drawing Sheets

(56) References Cited

U.S. PATENT DOCUMENTS

| | | | | |
|---|---|---|---|---|
| 7,620,567 B2* | 11/2009 | George | G06Q 20/382 | 705/14.27 |
| 8,267,694 B1* | 9/2012 | Lamka | G09B 19/0038 | 434/236 |
| 8,341,048 B2* | 12/2012 | Beckers | G06Q 20/105 | 705/35 |
| 8,371,502 B1* | 2/2013 | Galit | G06Q 30/02 | 235/380 |
| 8,392,299 B2* | 3/2013 | Sorbe | G06Q 20/10 | 705/30 |
| 8,504,473 B2* | 8/2013 | Paintin | G06Q 20/10 | 705/39 |
| 8,682,717 B2* | 3/2014 | Maw | G06Q 20/04 | 705/14.23 |
| 9,213,965 B1* | 12/2015 | Brooks | G06Q 10/0875 | |
| 9,515,999 B2* | 12/2016 | Ylonen | H04L 63/062 | |
| 9,641,332 B1* | 5/2017 | Yung | H04L 9/30 | |
| 9,892,460 B1* | 2/2018 | Winklevoss | G06Q 40/00 | |
| 9,898,781 B1* | 2/2018 | Silverman | G06Q 40/00 | |
| 9,965,804 B1* | 5/2018 | Winklevoss | G06Q 40/04 | |
| 10,002,389 B1* | 6/2018 | Winklevoss | G06Q 40/04 | |
| 2001/0034719 A1* | 10/2001 | Durand | G06Q 20/10 | 705/65 |
| 2002/0107797 A1* | 8/2002 | Combaluzier | G06Q 20/04 | 705/41 |
| 2004/0215507 A1* | 10/2004 | Levitt | G06Q 30/02 | 705/14.13 |
| 2005/0149394 A1* | 7/2005 | Postrel | G06Q 30/02 | 705/14.25 |
| 2005/0165684 A1* | 7/2005 | Jensen | G06Q 20/00 | 705/44 |
| 2005/0279826 A1* | 12/2005 | Merrien | G06Q 20/341 | 235/380 |
| 2006/0168451 A1* | 7/2006 | Ishibashi | G06F 21/10 | 713/176 |
| 2007/0038515 A1* | 2/2007 | Postrel | G06Q 20/06 | 705/14.3 |
| 2008/0052169 A1* | 2/2008 | O'Shea | G06Q 20/10 | 705/14.17 |
| 2008/0147502 A1* | 6/2008 | Baker | G06Q 30/02 | 705/14.26 |
| 2008/0243703 A1* | 10/2008 | Al-Herz | G06Q 20/02 | 705/69 |
| 2009/0148819 A1* | 6/2009 | Lin | G06Q 30/02 | 434/236 |
| 2009/0276344 A1* | 11/2009 | Maw | G06Q 20/04 | 705/30 |
| 2011/0010238 A1* | 1/2011 | Postrel | G06Q 30/02 | 705/14.38 |
| 2011/0107104 A1* | 5/2011 | Zhang | H04L 63/061 | 713/171 |
| 2011/0161233 A1* | 6/2011 | Tieken | G06Q 20/04 | 705/71 |
| 2015/0012443 A1* | 1/2015 | Bhat | G06Q 40/00 | 705/50 |
| 2015/0089214 A1* | 3/2015 | Dupre | H04L 63/0853 | 713/155 |
| 2016/0342989 A1* | 11/2016 | Davis | G06Q 20/385 | |
| 2017/0132630 A1* | 5/2017 | Castinado | G06Q 20/4014 | |
| 2017/0140408 A1* | 5/2017 | Wuehler | G06Q 30/0207 | |
| 2017/0232300 A1* | 8/2017 | Tran | H04L 67/12 | 434/247 |
| 2017/0243213 A1* | 8/2017 | Castinado | G06Q 20/401 | |
| 2017/0243222 A1* | 8/2017 | Balasubramanian | G06Q 20/4016 | |
| 2017/0243286 A1* | 8/2017 | Castinado | G06Q 40/00 | |
| 2017/0243287 A1* | 8/2017 | Johnsrud | G06Q 40/025 | |
| 2017/0244707 A1* | 8/2017 | Johnsrud | H04L 63/08 | |
| 2017/0279774 A1* | 9/2017 | Booz | G06F 16/24568 | |
| 2017/0330217 A1* | 11/2017 | Postrel | G06Q 30/02 | |
| 2018/0096313 A1* | 4/2018 | Chenard | G06Q 20/10 | |
| 2018/0158050 A1* | 6/2018 | Chenard | G06F 21/64 | |
| 2018/0165758 A1* | 6/2018 | Saxena | G06Q 40/00 | |
| 2018/0174231 A1* | 6/2018 | Chenard | H04L 9/0825 | |

* cited by examiner

SYSTEMS AND METHODS FOR FACILITATING A TIME VARYING CRYPTOCURRENCY TRANSFER OVER A DECENTRALIZED NETWORK THROUGH SMART CONTRACTS ASSOCIATED WITH CRYPTOCURRENCY BLOCKCHAIN TECHNOLOGY

FIELD OF THE DISCLOSURE

The present disclosure relates to systems and methods for facilitating a time varying cryptocurrency transfer over a decentralized network through smart contracts associated with cryptocurrency blockchain technology.

BACKGROUND

A smart contract is a computer protocol that can implement certain rules for the performance of a contract. Smart contracts can also be implemented with a cryptocurrency, where the cryptocurrency can be transferred or released to another party on completion of a set of conditions written within the smart contract. Smart contracts provide freedom to customize the terms upon which the cryptocurrency is provided to another party.

For some organizations, it may be desirable to transfer a time varying cryptocurrency using smart contracts.

SUMMARY

One aspect of the present disclosure relates to a system configured for facilitating a time varying cryptocurrency transfer over a decentralized network through smart contracts associated with cryptocurrency blockchain technology. Although the system described herein presumes a cryptocurrency transfer over a decentralized network, a person having ordinary skill in the art would appreciate that the techniques described herein can be implemented over a centralized network. The system can include one or more hardware processors configured by machine-readable instructions. The processor(s) can be configured to receive, at a network interface, a first electronic request for cryptocurrency transfer from a first account associated with a first cryptocurrency public key to a second account associated with a second cryptocurrency public key. The first electronic request can be based on a first smart contract. The first smart contract can ensure transferring a first determined value of cryptocurrency to the second account on fulfillment of a first set of conditions. The first smart contract can include at least one of a product identifier or a maximum amount value. The maximum amount value can be a fixed numerical value or a percentage (fraction) of the value of the product associated with the product identifier. The processor(s) can be configured to transmit a second electronic request for a time varying cryptocurrency transfer from the second account to a third account associated with a third cryptocurrency public key. The second electronic request can be based on a second smart contract. The second smart contract can ensure transferring a second determined value of cryptocurrency to the third account on fulfillment of a second set of conditions. The second smart contract can include a first timestamp value, the product identifier, the maximum amount value, and an amount determining algorithm. In some implementations, the amount determining algorithm can be replaced with a mathematical equation. The second smart contract can determine the second determined value of cryptocurrency received by the third account using an amount determining algorithm. The processor(s) can be configured to, upon completion of the second smart contract, fulfill the first set of conditions, thereby completing the first smart contract.

Another aspect of the present disclosure relates to a method for facilitating a time varying cryptocurrency transfer over a decentralized network through smart contracts associated with cryptocurrency blockchain technology. The method can include receiving, at a network interface, a first electronic request for cryptocurrency transfer from a first account associated with a first cryptocurrency public key to a second account associated with a second cryptocurrency public key. The first electronic request can be based on a first smart contract. The first smart contract can ensure transferring a first determined value of cryptocurrency to the second account on fulfillment of a first set of conditions. The first smart contract can include at least one of a product identifier or a maximum amount value. The method can include transmitting a second electronic request for a time varying cryptocurrency transfer from the second account to a third account associated with a third cryptocurrency public key. The second electronic request can be based on a second smart contract. The second smart contract can ensure transferring a second determined value of cryptocurrency to the third account on fulfillment of a second set of conditions. The second smart contract can include a first timestamp value, the product identifier, the maximum amount value, and an amount determining algorithm. The second smart contract can determine the second determined value of cryptocurrency received by the third account using an amount determining algorithm. The method can include, upon completion of the second smart contract, fulfilling the first set of conditions, thereby completing the first smart contract.

Yet another aspect of the present disclosure relates to a non-transient computer-readable storage medium having instructions embodied thereon, the instructions being executable by one or more processors to perform a method for facilitating a time varying cryptocurrency transfer over a decentralized network through smart contracts associated with cryptocurrency blockchain technology. The method can include receiving, at a network interface, a first electronic request for cryptocurrency transfer from a first account associated with a first cryptocurrency public key to a second account associated with a second cryptocurrency public key. The first electronic request can be based on a first smart contract. The first smart contract can ensure transferring a first determined value of cryptocurrency to the second account on fulfillment of a first set of conditions. The first smart contract can include at least one of a product identifier or a maximum amount value. The method can include transmitting a second electronic request for a time varying cryptocurrency transfer from the second account to a third account associated with a third cryptocurrency public key. The second electronic request can be based on a second smart contract. The second smart contract can ensure transferring a second determined value of cryptocurrency to the third account on fulfillment of a second set of conditions. The second smart contract can include a first timestamp value, the product identifier, the maximum amount value, and an amount determining algorithm. The second smart contract can determine the second determined value of cryptocurrency received by the third account using an amount determining algorithm. The method can include, upon completion of the second smart contract, fulfilling the first set of conditions, thereby completing the first smart contract.

These and other features, and characteristics of the present technology, as well as the methods of operation and functions of the related elements of structure and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the invention. As used in the specification and in the claims, the singular form of "a", "an", and "the" include plural referents unless the context clearly dictates otherwise.

DETAILED DESCRIPTION

Various embodiments and aspects of the inventions will be described with reference to details discussed below, and the accompanying drawings will illustrate the various embodiments. The following description and drawings are illustrative of the invention and are not to be construed as limiting the invention. Numerous specific details are described to provide a thorough understanding of various embodiments of the present invention. However, in certain instances, well-known or conventional details are not described in order to provide a concise discussion of embodiments of the present inventions.

Reference in the specification to "one embodiment" or "an embodiment" or "another embodiment" means that a particular feature, structure, or characteristic described in conjunction with the embodiment can be included in at least one embodiment of the invention. The appearances of the phrase "in one embodiment" in various places in the specification do not necessarily all refer to the same embodiment. The processes depicted in the figures that follow are performed by processing logic that comprises hardware (e.g., circuitry, dedicated logic, etc.), software, or a combination of both. Although the processes are described below in terms of some sequential operations, it should be appreciated that some of the operations described can be performed in a different order. Moreover, some operations can be performed in parallel rather than sequentially.

Figure 1:
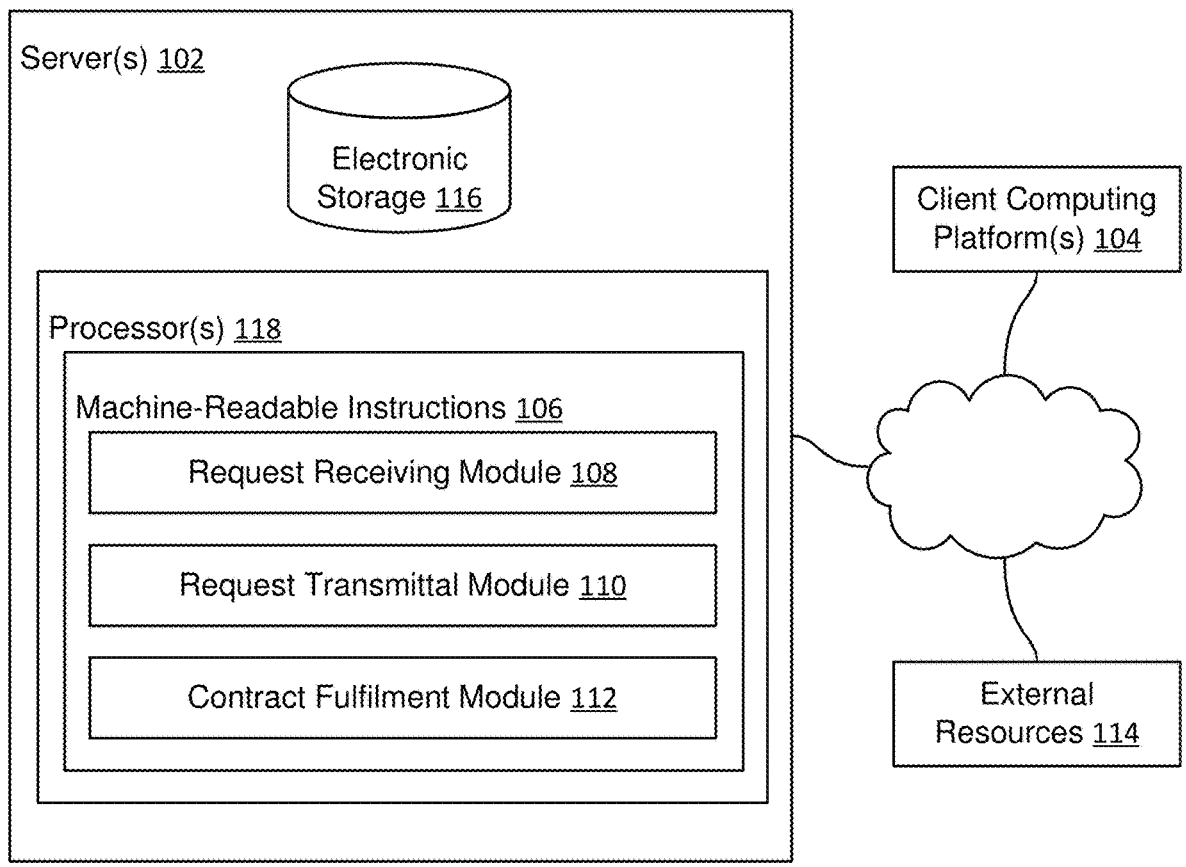
FIG. 1 illustrates a system configured for facilitating a time varying cryptocurrency transfer over a decentralized network through smart contracts associated with cryptocurrency blockchain technology, in accordance with one or more implementations.

FIG. 1 illustrates a system 100 configured for facilitating a time varying cryptocurrency transfer over a decentralized network through smart contracts associated with cryptocurrency blockchain technology, in accordance with one or more implementations. In some implementations, system 100 can include one or more servers 102. Server(s) 102 can be configured to communicate with one or more client computing platforms 104 according to a client/server architecture and/or other architectures. Client computing platform(s) 104 can be configured to communicate with other client computing platforms via server(s) 102 and/or according to a peer-to-peer architecture and/or other architectures. Users can access system 100 via client computing platform(s) 104.

Server(s) 102 can be configured by machine-readable instructions 106. Machine-readable instructions 106 can include one or more instruction modules. The instruction modules can include computer program modules. The instruction modules can include one or more of a request receiving module 108, a request transmittal module 110, a set fulfilment module 112, and/or other instruction modules.

Request receiving module 108 can be configured to receive, at a network interface, a first electronic request for cryptocurrency transfer from a first account associated with a first cryptocurrency public key to a second account associated with a second cryptocurrency public key. The first account can be associated with a merchant selling a good or service. The second account can be associated with a data analytics provider. The electronic request may include a request that is of or relating to electronics; concerned with or using devices that operate on principles governing the behavior of electrons, according to some implementations.

The first electronic request can be based on a first smart contract. The first smart contract can be created using a first cryptocurrency private key associated with the first account. The first cryptocurrency private key can be associated with the first cryptocurrency public key, or at least a portion thereof, using a first hash function. The first smart contract can ensure transferring a first determined value of cryptocurrency to the second account on fulfillment of a first set of conditions. The first set of conditions can include receiving identity of a user associated with the second account. The first smart contract can include at least one of a product identifier or a maximum amount value. The maximum amount value can be a fixed numerical value or a percentage (fraction) of the value of the product associated with the product identifier. In one or more embodiments, the first set of conditions can include an amount determining algorithm. The amount determining algorithm, in one or more implementations can be time varying in which a decrementing amount can be determined when the algorithm is applied on the maximum amount value based on the time a second smart contract is executed, as explained further herein.

Request transmittal module 110 can be configured to transmit a second electronic request for a time varying cryptocurrency transfer from the second account to a third account associated with a third cryptocurrency public key. The first timestamp can be a timestamp generated at time of transmitting the second electronic request. In one or more implementations identifying information of an authorized user of the third account may be not known to an authorized user of the first account until completion of the first smart contract. In one or more implementations identifying information of an authorized user of the third account may be known to an authorized user of the second account prior to transmitting the second electronic request. The third account can be associated with a consumer of the good or service.

The second electronic request can be based on a second smart contract. The second smart contract can be created using a second cryptocurrency private key associated with the second account. The second cryptocurrency private key can be associated with the second cryptocurrency public key, or at least a portion thereof, using a second hash function. The second smart contract can ensure transferring a second determined value of cryptocurrency to the third account on fulfillment of a second set of conditions. By way of non-limiting example, the second smart contract can include a first timestamp value, the product identifier, the maximum amount value, and an amount determining algorithm. The second smart contract can determine the second determined value of cryptocurrency received by the third account using the amount determining algorithm. The amount determining algorithm can decrement the cryptocurrency transferred to the third account based on a time period determined by subtracting the first timestamp value from a second timestamp.

By way of non-limiting example, at the time the second electronic request has been transferred, or momentarily prior to the transfer, a current timestamp value can be inserted as the first timestamp value. Thereafter, a time period can be determined based on the time of execution of the second contract (and subtracting the first timestamp value from the second timestamp value). In some implementations, the second timestamp can be the timestamp generate at time of completion of the second contract.

In one or more implementations, the amount determining algorithm can be configured to reduce the cryptocurrency transferred to the third account by a predetermined factor (provided in the amount determining algorithm) with an increase in the time period value. The time determining algorithm can also be configured to void the transaction of the second contract if the time period exceeds a predetermined expiration time value. In one implementation, the expiration time value is set within the amount determining algorithm. In another implementation, the expiration time value is determined by a computing system associated with the network device receiving the first or second electronic requests. In yet another embodiment, the expiration time value is transmitted within the first contract. In one implementation, the data analytics provider can transfer the second determined value of cryptocurrency to the third account based on the amount determining algorithm transmitted by the first account. The amount determining algorithm can be transmitted to the second account via the first smart contract. The amount determining algorithm can be generated by the computing device coupled to the network interface. In this implementation, the generation of the amount determining algorithm can be based on a predetermined set of criteria known to the computing device. In another implementation, the amount determining algorithm can be predetermined and associated with the first account and stored in a database coupled to the computing device.

Contract fulfillment module 112 can be configured to, determine whether the second contract has been successfully completed and upon determination of completion of the second smart contract (or failure thereof), module 112 can be configured to fulfill the first set of conditions, thereby completing the first smart contract. Module 112 can be configured to void the first smart contract when it is determined that the second contract has been voided by the amount determining algorithm.

In some implementations, server(s) 102, client computing platform(s) 104, and/or external resources 114 can be operatively linked via one or more electronic communication links. For example, such electronic communication links can be established, at least in part, via a network such as the Internet and/or other networks. It will be appreciated that this is not intended to be limiting, and that the scope of this disclosure includes implementations in which server(s) 102, client computing platform(s) 104, and/or external resources 114 can be operatively linked via some other communication media.

A given client computing platform 104 can include one or more processors configured to execute computer program modules. The computer program modules can be configured to enable an expert or user associated with the given client computing platform 104 to interface with system 100 and/or external resources 114, and/or provide other functionality attributed herein to client computing platform(s) 104. By way of non-limiting example, the given client computing platform 104 can include one or more of a desktop computer, a laptop computer, a handheld computer, a tablet computing platform, a NetBook, a Smartphone, a gaming console, and/or other computing platforms.

External resources 114 can include sources of information outside of system 100, external entities participating with system 100, and/or other resources. In some implementations, some or all of the functionality attributed herein to external resources 114 can be provided by resources included in system 100.

Server(s) 102 can include electronic storage 116, one or more processors 118, and/or other components. Server(s) 102 can include communication lines, or ports to enable the exchange of information with a network and/or other computing platforms. Illustration of server(s) 102 in FIG. 1 is not intended to be limiting. Server(s) 102 can include a plurality of hardware, software, and/or firmware components operating together to provide the functionality attributed herein to server(s) 102. For example, server(s) 102 can be implemented by a cloud of computing platforms operating together as server(s) 102.

Electronic storage 116 can comprise non-transitory storage media that electronically stores information. The electronic storage media of electronic storage 116 can include one or both of system storage that is provided integrally (i.e., substantially non-removable) with server(s) 102 and/or removable storage that is removably connectable to server(s) 102 via, for example, a port (e.g., a USB port, a firewire port, etc.) or a drive (e.g., a disk drive, etc.). Electronic storage 116 can include one or more of optically readable storage media (e.g., optical disks, etc.), magnetically readable storage media (e.g., magnetic tape, magnetic hard drive, floppy drive, etc.), electrical charge-based storage media (e.g., EEPROM, RAM, etc.), solid-state storage media (e.g., flash drive, etc.), and/or other electronically readable storage media. Electronic storage 116 can include one or more virtual storage resources (e.g., cloud storage, a virtual private network, and/or other virtual storage resources). Electronic storage 116 can store software algorithms, information determined by processor(s) 118, information received from server(s) 102, information received from client computing platform(s) 104, and/or other information that enables server(s) 102 to function as described herein.

Processor(s) 118 can be configured to provide information processing capabilities in server(s) 102. As such, processor(s) 118 can include one or more of a digital processor, an analog processor, a digital circuit designed to process information, an analog circuit designed to process information, a state machine, and/or other mechanisms for electronically processing information. Although processor(s) 118 is shown in FIG. 1 as a single entity, this is for illustrative purposes only. In some implementations, processor(s) 118 can include a plurality of processing units. These processing units can be physically located within the same device, or processor(s) 118 can represent processing functionality of a plurality of devices operating in coordination. Processor(s) 118 can be configured to execute modules 108, 110, 112, and/or other modules. Processor(s) 118 can be configured to execute modules 108, 110, 112, and/or other modules by software; hardware; firmware; some combination of software, hardware, and/or firmware; and/or other mechanisms for configuring processing capabilities on processor(s) 118. As used herein, the term "module" can refer to any component or set of components that perform the functionality attributed to the module. This can include one or more physical processors during execution of processor readable instructions, the processor readable instructions, circuitry, hardware, storage media, or any other components.

It should be appreciated that although modules 108, 110, and 112 are illustrated in FIG. 1 as being implemented within a single processing unit, in implementations in which processor(s) 118 includes multiple processing units, one or more of modules 108, 110, and/or 112 can be implemented remotely from the other modules. The description of the functionality provided by the different modules 108, 110, and/or 112 described below is for illustrative purposes, and is not intended to be limiting, as any of modules 108, 110, and/or 112 can provide more or less functionality than is described. For example, one or more of modules 108, 110, and/or 112 can be eliminated, and some or all of its functionality can be provided by other ones of modules 108, 110, and/or 112. As another example, processor(s) 118 can be configured to execute one or more additional modules that can perform some or all of the functionality attributed below to one of modules 108, 110, and/or 112.

Figure 2:
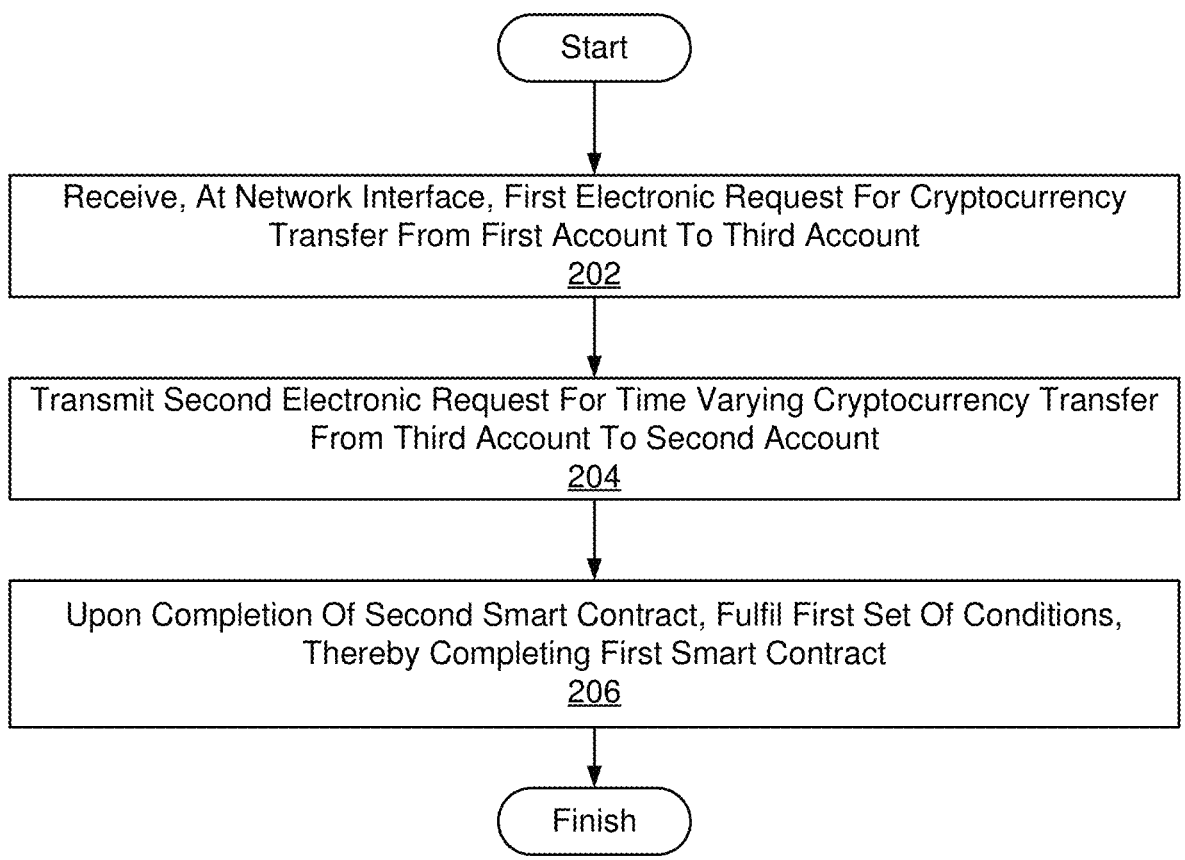
FIG. 2 illustrates a method for facilitating a time varying cryptocurrency transfer over a decentralized network through smart contracts associated with cryptocurrency blockchain technology, in accordance with one or more implementations.

FIG. 2 illustrates a method 200 for facilitating a time varying cryptocurrency transfer over a decentralized network through smart contracts associated with cryptocurrency blockchain technology, in accordance with one or more implementations. The operations of method 200 presented below are intended to be illustrative. In some implementations, method 200 can be accomplished with one or more additional operations not described, and/or without one or more of the operations discussed. Additionally, the order in which the operations of method 200 are illustrated in FIG. 2 and described below is not intended to be limiting.

In some implementations, method 200 can be implemented in one or more processing devices (e.g., a digital processor, an analog processor, a digital circuit designed to process information, an analog circuit designed to process information, a state machine, and/or other mechanisms for electronically processing information). The one or more processing devices can include one or more devices executing some or all of the operations of method 200 in response to instructions stored electronically on an electronic storage medium. The one or more processing devices can include one or more devices configured through hardware, firmware, and/or software to be specifically designed for execution of one or more of the operations of method 200.

An operation 202 can include receiving, at a network interface, a first electronic request for cryptocurrency transfer from a first account associated with a first cryptocurrency public key to a second account associated with a second cryptocurrency public key. The first electronic request can be based on a first smart contract. The first smart contract can ensure transferring a first determined value of cryptocurrency to the second account on fulfillment of a first set of conditions. The first smart contract can include at least one of a product identifier or a maximum amount value. Operation 202 can be performed by one or more hardware processors configured by machine-readable instructions including a module that is the same as or similar to request receiving module 108, in accordance with one or more implementations.

An operation 204 can include transmitting a second electronic request for a time varying cryptocurrency transfer from the second account to a third account associated with a third cryptocurrency public key. The second electronic request can be based on a second smart contract. The second smart contract can ensure transferring a second determined value of cryptocurrency to the third account on fulfillment of a second set of conditions. The second smart contract can include a first timestamp value, the product identifier, the maximum amount value, an amount determining algorithm, or a combination thereof. The amount determining algorithm can be replaced with a mathematical equation, in one or more implementations. The second smart contract can determine the second determined value of cryptocurrency received by the third account using an amount determining algorithm. Operation 204 can be performed by one or more hardware processors configured by machine-readable instructions including a module that is the same as or similar to request transmittal module 110, in accordance with one or more implementations.

An operation 206 can include, upon completion of the second smart contract, fulfilling the first set of conditions, thereby completing the first smart contract. Operation 206 can be performed by one or more hardware processors configured by machine-readable instructions including a module that is the same as or similar to set fulfillment module 112, in accordance with one or more implementations.

Figure 3:
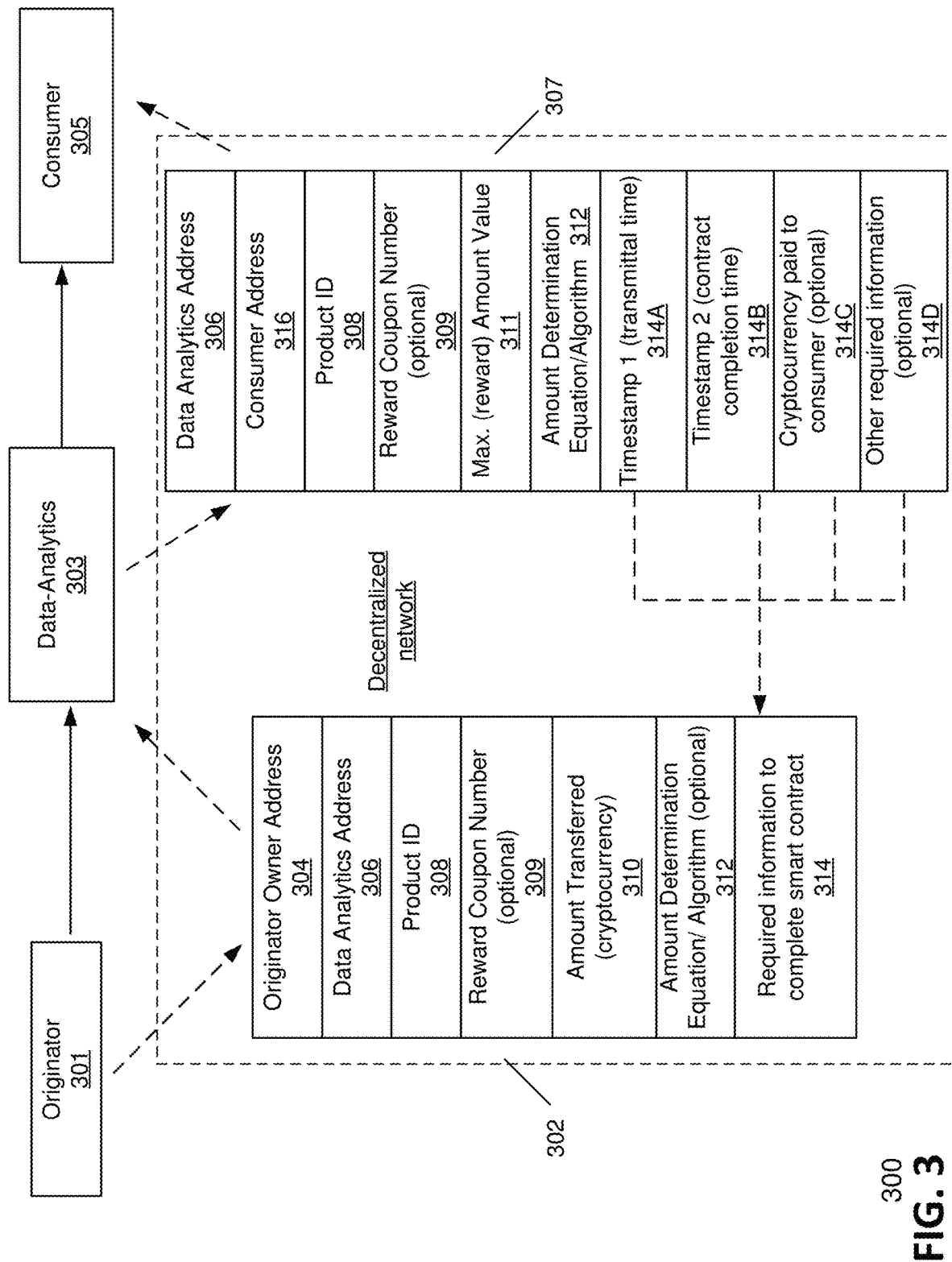
FIG. 3 illustrates a flow diagram to facilitate a time varying cryptocurrency transfer over a decentralized network showing the smart contracts that can be implemented, in accordance with one or more implementations.

FIG. 3 illustrates a flow diagram 300 to facilitate a time varying cryptocurrency transfer over a decentralized network showing the smart contracts that can be implemented, in accordance with one or more implementations. As a non-limiting example, as illustrated, the first account can be associated with an originator 301 who may want to provide a payment to consumer 305, represented by the third account herein. Originator 301 can, using its private cryptocurrency key create a smart contract 302 to transfer cryptocurrency 310 to data analytics provider 303, represented as the second account herein.

The private key, in one implementation, can be a random number generated from an encryption (e.g., SHA-256) algorithm. In one implementation, the public key is calculated from the private key using an elliptic curve multiplication. Address 304, 306, and 316 are each generated by applying a hash algorithm on at least a portion of the public key of each respective party, wherein each party has its own private cryptocurrency key using which each party authenticates itself as the true owner of the respective address.

Smart contract 302, in one or more implementations, reward coupon 309 can be associated with product identification 308. Product identification 308 can be any number of string that can clearly identify the product for which the reward is offered. In other implementations reward coupon 309 is not included in either smart contract 302 or 307. In these implementations the cryptocurrency awarded to consumer 305 as reward is based on a unique confirmation code (not shown) that is generated when consumer 305 purchases the product or service. In other implementations the reward can be based on an objective involving user action related to a product or service (e.g., share information related to product or service on social media, perform certain actions in an augmented/virtual reality setting, etc.). In some implementations, the objective is transmitted through smart contract 302. In other implementations, the objective is predetermined and known to data analytics provider 303, prior to transmission of smart contract 307 to consumer 305. In at least one implementation, consumer 305 is informed about the objective by originator 301 or data analytics provider 303, prior to, or during, transmission of smart contract 307 to consumer 305.

In other implementations, upon execution of smart contract 307 (upon completion of the objective or purchase, a confirmation is sent to data analytics provider 303. As a non-limiting example, such a confirmation can be provided through an application programming interface (API) call from the store to data analytics provider 303. Therefore, in such implementations a reward coupon 309 or purchase confirmation (or objective) code is not required, or in the alternative, is provided to act as a failsafe for situations where the API call is unavailable or fails.

Cryptocurrency 310 can include the maximum amount of reward that originator 301 may want to transfer to consumer 305 on completion of an objective or goal (e.g., purchase a good or service offered by originator 301 or its clients etc.). Cryptocurrency 310 can also include an optional surcharge or fee for data analytics provider 303 that is received upon completion of smart contract 302. This fee or surcharge can be considered as payment for the information provided by data analytics provider 303 to originator 301 upon completion of smart contract 302, as further explained herein. Amount determination algorithm 312 can optionally be provided in smart contract 302. In other implementations, Amount determination algorithm 312 can be pre-configured or known to data analytics provider and thus is not included in smart contract 302.

Upon receiving smart contract 302 at a computing device, data analytics provider 303, in some implementations, can generate smart contract 307 for consumer 305 with the information received from smart contract 302 as shown in FIG. 3. Maximum amount value 311 can be provided based on information received from amount transferred 310 or a preconfigured mathematical equation known to data analytics provider 303 and associated with originator. Preconfigured mathematical equation can be a percentage of amount transferred 310. Amount determination algorithm 312 is provided in smart contract 307 to determine the value of cryptocurrency awarded to consumer 314C at the time of completion of smart contract 307 based on the calculated time period. Smart contract 307 includes a transmittal timestamp value 314A which can be used to determine cryptocurrency awarded to consumer 314C using amount determination algorithm 312. In one or more implementations, at the time of purchasing the product associated with product identification 308, timestamp value 314B is determined and used to compute cryptocurrency awarded to consumer 314C by providing maximum amount value 311, transmittal timestamp 314A, and completion timestamp 3148 as input values to algorithm 312. After successful completion of smart contract 307, contract fulfillment module 112, in one implementation, provides the values of 314A and 314B, and optionally 314C and 314D, to smart contract 302 as required information to complete the smart contract 302. In one or more implementations, 314D can include a purchase confirmation code, proof of sale, store identification, or any other information (e.g., proof of completion of objective) that may be required by originator 301 to complete smart contract 302.

In one or more implementations, after the determination of the reward amount for the consumer 314C by the amount determination algorithm 312, any remaining cryptocurrency from maximum amount value 311 is automatically transferred back to the originator of the contract. As a non-limiting example, if the maximum amount of reward reserved for the consumer is $1, and the amount determination algorithm, based on the time period, determined an award of $0.75, then at the time of completion of smart contract 307 $0.25 of cryptocurrency is automatically transferred back to data-analytics provider 303. Thereafter contract fulfillment module 112, returns at least one of the amount of cryptocurrency awarded to consumer 314C, timestamp value 314A, or timestamp value 314B to complete execution of smart contract 302. At the time of completion of smart contract 302, $0.25 is transferred back to originator 301. In some implementations a data analytics surcharge is awarded by originator 301 to data analytics provider 303 through smart contract 302, at the time of completion of that contract. In some implementations, to ensure privacy and prevent misuse, any confidential information (e.g., 314A, 314B,314C,314D, etc.) provided within smart contract 302 or 307 can be encrypted using the cryptocurrency public key of the contract/cryptocurrency receiving party.

Although, the techniques described herein employ the use of data analytics provider 303, in some implementations, smart contract 307 can be directly transmitted from originator 301 to consumer 305. Originator 301 can also include a third party website that offers a product or good for sale on behalf of a manufacturer or brand owner. Thus, a person having ordinary skill in the art would appreciate that in such implementations the tasks that are performed by data analytics provider 303 can be performed by originator 301 and no smart contract 302 is generated.

Figure 4:
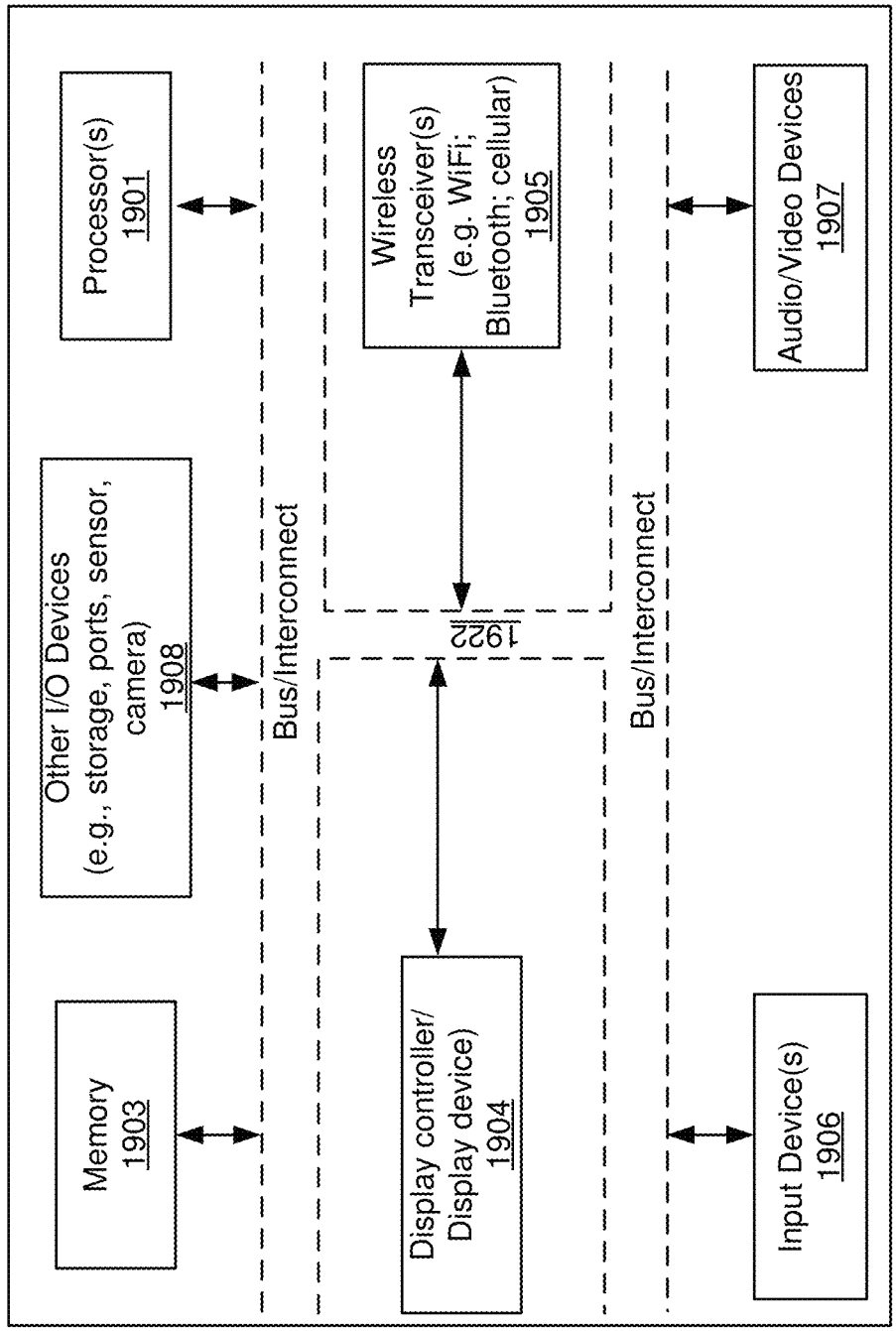
FIG. 4 is a block diagram illustrating a data processing system such as a computing device, in accordance with one or more implementations.

FIG. 4 is a block diagram illustrating a data processing system such as a computing system 1900 which may be used with one or more implementations describe herein. For example, system 1900 can be implemented as part of a system for facilitating a time varying cryptocurrency transfer over a decentralized network through smart contracts associated with cryptocurrency blockchain technology. It should be apparent from this description that aspects of the present invention can be embodied, at least in part, in software. That is, the techniques may be carried out in a computer system or other computer system in response to its processor, such as a microprocessor, executing sequences of instructions contained in memory, such as a ROM, DRAM, mass storage, or a remote storage device. In various embodiments, hardware circuitry may be used in combination with software instructions to implement the present invention. Thus, the techniques are not limited to any specific combination of hardware circuitry and software nor to any particular source for the instructions executed by the computer system. In addition, throughout this description, various functions and operations are described as being performed by or caused by software code to simplify description. However, those skilled in the art will recognize what is meant by such expressions is that the functions result from execution of the code by a processor.

In one embodiment, system 1900 can represent a computing device associated with data analytics provider 303. System 1900 can have a distributed architecture having a plurality of nodes coupled through a network, or all of its components may be integrated into a single unit. Computing system 1900 can represent any of the data processing systems described above performing any of the processes or methods described above. In one embodiment, computer system 1900 can be implemented as integrated circuits (ICs), discrete electronic devices, modules adapted to a circuit board such as a motherboard, an add-in card of the computer system, and/or as components that can be incorporated within a chassis/case of any computing device. System 1900 is intended to show a high level view of many components of any data processing unit or computer system. However, it is to be understood that additional or fewer components may be present in certain implementations and furthermore, different arrangement of the components shown may occur in other implementations. System 1900 can represent a desktop, a laptop, a tablet, a server, a mobile phone, a programmable logic controller, a personal digital assistant (PDA), a personal communicator, a network router or hub, a wireless access point (AP) or repeater, a set-top box, or a combination thereof.

In one embodiment, system 1900 includes processor 1901, memory 1903, and devices 1905-1908 via a bus or an interconnect 1922. Processor 1901 can represent a single processor or multiple processors with a single processor core or multiple processor cores included therein. Processor 1901 can represent one or more general-purpose processors such as a microprocessor, a central processing unit (CPU), Micro Controller Unit (MCU), etc. Processor 1901 can be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processor 1901 may also be one or more special-purpose processors such as an application specific integrated circuit (ASIC), a cellular or baseband processor, a field programmable gate array (FPGA), a digital signal processor (DSP), a network processor, a graphics processor, a network processor, a communications processor, a cryptographic processor, a co-processor, an embedded processor, or any other type of logic capable of processing instructions. Processor 1901, can also be a low power multi-core processor socket such as an ultra low voltage processor, may act as a main processing unit and central hub for communication with the various components of the system. Such processor can be implemented as a system on chip (SoC).

Processor 1901 is configured to execute instructions for performing the operations and methods discussed herein. System 1900 further includes a graphics interface that communicates with graphics subsystem 1904, which may include a display controller and/or a display device. Processor 1901 can communicate with memory 1903, which in an embodiment can be implemented via multiple memory devices to provide for a given amount of system memory. In various implementations the individual memory devices can be of different package types such as single die package (SDP), dual die package (DDP) or quad die package (QDP). These devices can in some embodiments be directly soldered onto a motherboard to provide a lower profile solution, while in other embodiments the devices can be configured as one or more memory modules that in turn can couple to the motherboard by a given connector. Memory 1903 can be a machine readable non-transitory storage medium such as one or more volatile storage (or memory) devices such as random access memory (RAM), dynamic RAM (DRAM), synchronous DRAM (SDRAM), static RAM (SRAM), or other types of storage devices such as hard drives and flash memory. Memory 1903 may store information including sequences of executable program instructions that are executed by processor 1901, or any other device. System 1900 can further include IO devices such as devices 1905-1908, including wireless transceiver(s) 1905, input device(s) 1906, audio IO device(s) 1907, and other IO devices 1908.

Wireless transceiver 1905 can be a WiFi transceiver, an infrared transceiver, a Bluetooth transceiver, a WiMax transceiver, a wireless cellular telephony transceiver, a satellite transceiver (e.g., a global positioning system (GPS) transceiver), or other radio frequency (RF) transceivers, network interfaces (e.g., Ethernet interfaces) or a combination thereof. Input device(s) 1906 can include a mouse, a touch pad, a touch sensitive screen (which may be integrated with display device 1904), a pointer device such as a stylus, and/or a keyboard (e.g., physical keyboard or a virtual keyboard displayed as part of a touch sensitive screen). Other optional devices 1908 can include a storage device (e.g., a hard drive, a flash memory device), universal serial bus (USB) port(s), parallel port(s), serial port(s), a printer, a network interface, a bus bridge (e.g., a PCI-PCI bridge), sensor(s) (e.g., a motion sensor such as an accelerometer, gyroscope, a magnetometer, a light sensor, compass, a proximity sensor, etc.), or a combination thereof. Optional devices 1908 can further include an imaging processing subsystem (e.g., a camera), which may include an optical sensor, such as a charged coupled device (CCD) or a complementary metal-oxide semiconductor (CMOS) optical sensor, utilized to facilitate camera functions, such as recording photographs and video clips. Certain sensors can be coupled to interconnect 1922 via a sensor hub (not shown), while other devices such as a keyboard or thermal sensor may be controlled by an embedded controller (not shown), dependent upon the specific configuration or design of system 1900.

To provide for persistent storage of information such as data, applications, one or more operating systems and so forth, in one embodiment, a mass storage (not shown) may also couple to processor 1901. In various embodiments, to enable a thinner and lighter system design as well as to improve system responsiveness, this mass storage may be implemented via a solid state device (SSD). However in other embodiments, the mass storage may primarily be implemented using a hard disk drive (HDD) with a smaller amount of SSD storage to act as a SSD cache to enable non-volatile storage of context state and other such information during power down events so that a fast power up can occur on RE-initiation of system activities. Also a flash device may be coupled to processor 1901, e.g., via a serial peripheral interface (SPI). This flash device may provide for non-volatile storage of system software, including a basic input/output software (BIOS) as well as other firmware of the system.

Note that while system 1900 is illustrated with various components of a data processing system, it is not intended to represent any particular architecture or manner of interconnecting the components; as such details are not germane to embodiments of the present invention. It will also be appreciated that network computers, handheld computers, mobile phones, and other data processing systems which have fewer components or perhaps more components may also be used with embodiments of the invention.

Although the present technology has been described in detail for the purpose of illustration based on what is currently considered to be the most practical and preferred implementations, it is to be understood that such detail is solely for that purpose and that the technology is not limited to the disclosed implementations, but, on the contrary, is intended to cover modifications and equivalent arrangements that are within the spirit and scope of the appended claims. For example, it is to be understood that the present technology contemplates that, to the extent possible, one or more features of any implementation can be combined with one or more features of any other implementation.

What is claimed is:

1. A blockchain technology based system, comprising: at least one computer, in a decentralized network, comprising a processor and a non-transitory computer memory, wherein the non-transitory computer memory storing instructions that, when executed by the processor, cause the processor to perform:
receiving a first set of self-executing computer instructions, wherein the first set of self-executing computer instructions executes upon a fulfillment of a first set of conditions;
receiving a first set of data associated with the first set of self-executing computer instructions;
generating a second set of self-executing computer instructions based on the first set of data, wherein the second set of self-executing computer instructions executes upon a fulfillment of a second set of conditions, and wherein the execution of the second set of self-executing computer instructions fulfills the first set of conditions;
transmitting the second set of self-executing computer instructions and the second set of conditions to the decentralized network;
executing the second set of self-executing computer instructions;
in response to executing the second set of self-executing computer instructions, transferring cryptocurrency from a second account to a third account and determining the first set of conditions;
executing the first set of self-executing computer instructions based on determined first set of conditions; and
in response to executing the first set of self-executing computer instructions, transferring the cryptocurrency from a first account to the second account.

2. The system of claim 1, wherein the blockchain technology based second set of self-executing computer instructions includes an amount determining algorithm, wherein the amount determining algorithm determines a second monetary value of cryptocurrency received by the third account, and wherein the second set of self-executing computer instructions includes a first timestamp value, and wherein the amount determining algorithm decrements the second monetary value of cryptocurrency received by the third account based on a time period determined by subtracting the first timestamp value from a second timestamp value, wherein the first timestamp value is a timestamp generated at time of transmitting the second set of self-executing computer instructions, and wherein the second timestamp value is the timestamp generated by the at least one digital processing device at time of execution of the second set of self-executing computer instructions.

3. The system of claim 2, wherein the first set of conditions includes receiving data related to an identity of a user associated with the third account, the time period determined by the amount determining algorithm, and determined value of cryptocurrency transferred to the third account from the second account.

4. The system of claim 1, wherein identifying information of an authorized user of the third account is not known to an authorized user of the first account until completion of the first set of self-executing computer instructions by the at least one digital processing device.

5. The system of claim 1, wherein identifying information of an authorized user of the third account is known to an authorized user of the second account prior to generation of the second set of self-executing computer instructions.

6. The system of claim 1, wherein the first set of self-executing computer instructions is generated by another processing system using a first cryptocurrency private key using a first hash function.

7. The system of claim 2, wherein the second monetary value of cryptocurrency determined by the amount determining algorithm is based on a predetermined set of criteria provided by an authorized user of the first account.

8. A blockchain technology based method comprising:
receiving, at a network interface of a processing system in a decentralized network, a first set of self-executing computer instructions, wherein the first set of self-executing computer instructions executes upon a fulfillment of a first set of conditions;
receiving, by the processing system, a first set of data associated with the first set of self-executing computer instructions;
generating, by the processing system, a second set of self-executing computer instructions based on the first set of data, wherein the second set of self-executing computer instructions executes upon a fulfillment of a second set of conditions, and wherein the execution of the second set of self-executing computer instructions fulfills the first set of conditions;
transmitting, by the processing system, the second set of self-executing computer instructions and the second set of conditions to the decentralized network;
executing the second set of self-executing computer instructions;
in response to executing the second set of self-executing computer instructions, transferring cryptocurrency from a second account to a third account and determining the first set of conditions;
executing the first set of self-executing computer instructions based on determined first set of conditions; and
in response to executing the first set of self-executing computer instructions, transferring the cryptocurrency from a first account to the second account.

9. The method of claim 8, wherein the second set of self-executing computer instructions further includes an amount determining algorithm, wherein the amount determining algorithm determines a second monetary value of cryptocurrency received by the third account, and wherein the second set of self-executing computer instructions includes a first timestamp value, and wherein the amount determining algorithm decrements the second monetary value of cryptocurrency received by the third account based on a time period determined by subtracting the first timestamp value from a second timestamp value, wherein the first timestamp value is a timestamp generated at time of transmitting the second set of self-executing computer instructions, and wherein the second timestamp value is the timestamp generated by the at least one digital processing device at time of execution of the second set of self-executing computer instructions.

10. The method of claim 9, wherein the first set of conditions includes receiving data related to an identity of a user associated with the third account, the time period determined by the amount determining algorithm, and determined value of cryptocurrency transferred to the third account from the second account.

11. The method of claim 8, wherein identifying information of an authorized user of the third account is not known to an authorized user of the first account until completion of the first set of self-executing computer instructions by the at least one digital processing device.

12. The method of claim 8, wherein identifying information of an authorized user of the third account is known to an authorized user of the second account prior to generation of the second set of self-executing computer instructions.

13. The method of claim 8, wherein the first set of self-executing computer instructions is generated by another processing system using a first cryptocurrency private key using a first hash function.

14. A non-transitory computer-readable storage medium comprising instructions which when executed by a processing system in a distributed network comprising at least one hardware core performs a blockchain technology based method comprising:
  receiving a first set of self-executing computer instructions, wherein the first set of self-executing computer instructions executes upon a fulfillment of a first set of conditions;
  receiving a first set of data associated with the first set of self-executing computer instructions;
  generating a second set of self-executing computer instructions based on the first set of data, wherein the second set of self-executing computer instructions executes upon a fulfillment of a second set of conditions and wherein the execution of the second set of self-executing computer instructions fulfills the first set of conditions;
  transmitting the second set of self-executing computer instructions and the second set of conditions to the decentralized network;
  executing the second set of self-executing computer instructions;
  in response to executing the second set of self-executing computer instructions, transferring cryptocurrency from a second account to a third account and determining the first set of conditions;
  executing the first set of self-executing computer instructions based on determined first set of conditions; and
  in response to executing the first set of self-executing computer instructions, transferring the cryptocurrency from a first account to the second account.

15. The non-transitory computer-readable storage medium of claim 14, wherein the second set of self-executing computer instructions further includes an amount determining algorithm that, wherein the amount determining algorithm determines a second monetary value of cryptocurrency received by the third account, and wherein the second set of self-executing computer instructions includes a first timestamp value, and wherein the amount determining algorithm decrements the second monetary value of cryptocurrency received by the third account based on a time period determined by subtracting the first timestamp value from a second timestamp value, wherein the first timestamp value is a timestamp generated at time of transmitting the second set of self-executing computer instructions, and wherein the second timestamp value is the timestamp generated by the at least one digital processing device at time of execution of the second set of self-executing computer instructions.

16. The non-transitory computer-readable storage medium of claim 15, wherein the first set of conditions includes receiving data related to an identity of a user associated with the third account, the time period determined by the amount determining algorithm, and determined value of cryptocurrency transferred to the third account from the second account.

17. The non-transitory computer-readable storage medium of claim 14, wherein identifying information of an authorized user of the third account is not known to an authorized user of the first account until completion of the first set of self-executing computer instructions by the at least one digital processing device.

18. The non-transitory computer-readable storage medium of claim 14, wherein identifying information of an authorized user of the third account is known to an authorized user of the second account prior to generation of the second set of self-executing computer instructions.

19. The non-transitory computer-readable storage medium of claim 14, wherein the first set of self-executing computer instructions is generated by another processing system using a first cryptocurrency private key using a first hash function.

20. The non-transitory computer-readable storage medium of claim 15, wherein the second monetary value of cryptocurrency determined by the amount determining algorithm is based on a predetermined set of criteria provided by an authorized user of the first account.

* * * * *